United States Patent  [11] 3,627,820

[72] Inventors  Kiyoshi Chujo;
                Toru Ikuta, both of Iruma-gun, Saitama, Japan
[21] Appl. No. 701,096
[22] Filed     Jan. 29, 1968
[45] Patented  Dec. 14, 1971
[73] Assignee  Daicel Ltd.
               Osaka, Japan
[32] Priority  Jan. 25, 1967
[33]           Japan
[31]           42/4575

[54] POLYMERIZATION PROCESS
     6 Claims, No Drawings
[52] U.S. Cl. ........................................ 260/486 R,
        260/80 C, 260/85.5 N, 260/86.1 R, 260/86.1 N,
        260/88.7 R, 260/89.5 A, 260/89.7 R, 252/431 R,
        260/465.8 D, 260/465.8 R, 260/485 R, 260/485 J,
                    260/537 R, 260/561 R, 260/652 R
[51] Int. Cl. ............................................. C07c 69/54

[50] Field of Search............................................. 260/486,
        485, 465.8 D, 89.5 A, 80, 85.5 R, 86.1 N, 88.7 R,
                            89.7 R, 485 R, 485 J; 252/431 R

[56]              References Cited
                  FOREIGN PATENTS
37-1,268   4/1962   Japan ........................... 260/486
37-1,269   4/1962   Japan ........................... 260/486
37-1,270   4/1962   Japan ........................... 260/486

Primary Examiner—Lorraine A. Weinberger
Assistant Examiner—Paul J. Killos
Attorney—Woodhams, Blanchard and Flynn ABSTRACT: A process for polymerizing a monomer or a mixture of monomers selected from the group consisting of acrylates, methacrylates, acrylonitrile, methacrylonitrile, acrylamide, methacrylamide, methylol acrylamide and ethers thereof, methylol methacrylamide and ethers thereof, acrylic acids, methacrylic acid and vinylidene chloride in the presence of a catalyst composition consisting of a complex compound of acetyl acetone with trivalent manganese and a mercaptan, whereby the polymerization may be carried out at room temperature.

POLYMERIZATION PROCESS

BACKGROUND OF THE INVENTION

This invention relates to a process for polymerizing monomers or monomer mixtures in the presence of a new catalyst composition and, more particularly, relates to a method of conducting such a polymerization of monomers or monomer mixtures selected from the group of monomers, as hereinafter defined, in the presence of a catalyst composition consisting of a complex compound of acetyl acetone with trivalent manganese and a mercaptan.

DESCRIPTION OF THE PRIOR ART

It is already known that a complex compound of acetyl acetone with trivalent manganese can initiate the polymerization of methyl methacrylate and styrene at a high temperature above 60° C. (Kastning: Ang. Chem. (I.E.) 4, 322 (1965); Bamford et al: Chem. & Ind. 1627 (1965)). However, a disadvantage of the processes wherein said complex compound is used along as a catalyst has been its insufficient polymerizing activity, by virtue of which the catalyst will show substantially no polymerization initiating action at room temperature, such as 20° C.

An object of the invention is to provide an improved process for polymerizing various kinds of monomers or monomer mixtures in the presence of a new catalyst composition consisting of a complex compound of acetyl acetone with trivalent manganese and a mercaptan so that the initiation of the polymerization is remarkably improved and the polymerization can be conducted at room temperature.

Therefore, a further object of the invention is to provide a new catalyst composition for polymerizing various kinds of monomers or monomer mixtures, as hereinafter defined, which consists essentially of a complex compound of acetyl acetone with trivalent manganese and a mercaptan in which the polymerization-initiating action of the catalyst is remarkably increased by the coexistence of said complex compound with a mercaptan.

SUMMARY OF THE INVENTION

According to the present invention there is provided a process for preparing a polymerization product which comprises polymerizing a monomer selected from the group consisting of acrylates, methacrylates, acrylonitrile, methacrylonitrile, acrylamide, methacrylamide, methylol acrylamide and ethers thereof, such as methyl ether and butyl ether, methylol methacrylamide and ethers thereof, acrylic acid, methacrylic acid and vinylidene chloride, and mixtures of said monomers, in the presence of a catalyst composition consisting of a complex compound of acetyl acetone with trivalent manganese and a mercaptan. According to this process, there can be obtained an unexpected and advantageous result that the polymerization or copolymerization of the above-mentioned monomers can proceed smoothly even at room temperatures, such as 20° C.

DESCRIPTION OF THE PREFERRED EMBODIMENTS

The above-mentioned group of monomers can constitute the sole components of the polymerizable starting material, or they can be employed in admixture with one or more comonomers comprising ethylenic unsaturated compounds, e.g., styrene, vinyl esters, such as vinyl acetate and vinyl propionate, and vinyl chloride in an amount of more than 30 parts by weight of the former together with an amount of less than 70 parts by weight of the later.

The acrylates suitable for polymerization in the process according to this invention include the methyl, ethyl, propyl, n-butyl, iso-butyl and 2-ethylhexyl esters of acrylic acid. Also, the methacrylates suitable for polymerization according to this invention include the methyl, ethyl, propyl, n-butyl and iso-butyl esters of methacrylic acid.

The mercaptans which can be used in the present invention can be represented by the general formula RSH wherein R is an alkyl radical having from one to 18 carbon atoms. Such mercaptans include amyl mercaptan, octyl mercaptan, decyl mercaptan, lauryl mercaptan, tert-dodecyl mercaptan and stearyl mercaptan. The amount of the mercaptan used is not critical but it is generally used in an amount of from 0.1 to 10 mols, preferably 0.5 to 2 mols, to 1 mol of the complex compound of acetyl acetone with trivalent manganese. Further, the amount of the complex compound of acetyl acetone with trivalent manganese used is not also critical but it is generally used in an amount of from 0.01 to 2 mols, preferably 0.1 to 1 mol, to 100 mols of the monomer or monomer mixtures.

The polymerization temperature can be suitably selected at temperatures below 150° C.

The reaction by virtue of which the coexistence of the complex compound of acetyl acetone with trivalent manganese and the mercaptan, according to the present invention, has a particularly strong polymerization-initiating ability is still unclear. However, from the fact that, by the addition of hydroquinone, the catalyst composition according to this invention will lose its polymerization-initiating ability, it is considered that the polymerization will be carried out through a radical mechanism. Therefore, on the assumption that the mercaptan might act as a reducing agent in a redox polymerization catalyst, butyl acrylate and acrylonitrile were respectively made to react at room temperature by using several reducing agents, such as N,N-dimethyl aniline, diphenyl amine and ascorbic acid, instead of mercaptans in the catalyst, but the reactants did not polymerize at all or only slightly polymerized. On the other hand, when mercaptans were used, the polymerization proceeded quickly. From these facts, it is assumed that the coexistence of the complex compound of acetyl acetone with trivalent manganese and the mercaptan is not a mere redox system but it does constitute an unknown and special radical-generating source.

Now, there will be shown typical results which occurred when a catalyst composition according to this invention was used in the polymerization of various kinds of monomers as listed in table 1. In these cases, 90 mg. of a complex compound of acetyl acetone and trivalent manganese and 120 mg. of tert-dodecyl mercaptan were used in certain tests with 30 g. of the monomers as listed in table 1. The polymerization was carried out by mixing the materials and then letting them stand at room temperature (about 23° C.). The letters A, B, C, D and E are used in table I to show the polymerization states. These letters respectively have the following meanings. A means that the reaction started violently within 10 minutes after the addition of the mercaptan, B means that the reaction started quietly within 10 minutes after the addition of the mercaptan, C means that when the system was left standing overnight after the addition of the mercaptan, the progress of the polymerization was clearly seen, D means that when the system was left standing overnight after the addition of the mercaptan, the progress of the polymerization was slightly seen and E means that even when the system was left standing for one day after the addition of the mercaptan, no progress of the polymerization was seen at all.

Table I

| No. | Monomers | Mercaptan | Polymerization states |
| --- | --- | --- | --- |
| 1 | Methyl acrylate | Absent | E |
| 2 | Methyl acrylate | Present | A |
| 3 | Ethyl acrylate | Absent | E |
| 4 | Ethyl acrylate | Present | A |
| 5 | Butyl acrylate | Absent | E |
| 6 | Butyl acrylate | Present | A |
| 7 | 2-ethylhexyl acrylate | Absent | E |
| 8 | 2-ethylhexyl acrylate | Present | B |
| 9 | Methyl methacrylate | Absent | E |
| 10 | Methyl methacrylate | Present | C |
| 11 | n-butyl methacrylate | Absent | E |

| 12 | n-butyl methacrylate | Present | D |
| --- | --- | --- | --- |
| 13 | Acrylonitrile | Absent | E |
| 14 | Acrylonitrile | Present | B |
| 15 | Acrylamide | Absent | D |
| 16 | Acrylamide | Present | A |
| 17 | Methylol acrylamide | Absent | D |
| 18 | Methylol acrylamide | Present | A |
| 19 | Methacrylamide | Absent | E |
| 20 | Methacrylamide | Present | B |
| 21 | Butyl acrylate (40 parts) vinyl acetate (60 parts) | Absent | E |
| 22 | Butyl acrylate (40 parts) Vinyl acetate (60 parts) | Present | A |
| 23 | Acrylonitrile (80 parts) vinylidene chloride (20 parts) | Absent | E |
| 24 | Acrylonitrile (80 parts) vinylidene chloride (20 parts) | Present | C |
| 25 | Methacrylic acid | Absent | C |
| 26 | Methacrylic acid | Present | B |
| 27 | Vinylidene chloride | Absent | E |
| 28 | Vinylidene chloride | Present | A |

From table I it is evident that the catalyst composition according to this invention comprising the coexisting system of the complex compound and the mercaptan is very effective for the initiation of the polymerization of the monomers used.

The following examples are given to further illustrate the invention and are not intended as limitations thereof.

EXAMPLE 1

An Erlenmeyer flask of a capacity of 100 ml. was charged with 30 g. of butyl acrylate. Then 90 mg. of a complex compound of acetyl acetone and trivalent manganese (which compound shall be merely called the "complex compound" hereinafter) were put into it and contents were well stirred. The liquid was brown and the temperature was 23° C. 120 mg. of tert-dodecyl mercaptan were added thereto and the mixture was well stirred and was then left standing. In about 4 minutes, a polymerization reaction started. The polymerization proceeded with heat generation and foaming. In 1 hour, a remarkably viscous yellow liquid of a high viscosity was produced. On the other hand, when no mercaptan was added and only the complex compound was used, even when it was left standing overnight; no progress of the polymerization was seen.

EXAMPLE 2

A polymerization reaction was conducted in exactly the same manner as in example 1 except that acrylonitrile was used instead of the butyl acrylate. In 10 minutes after the addition of the mercaptan, a reaction started and gray polymer began to precipitate in the form of a powder. In 1 hour, the entire body became a gray block and cracked on the surface. On the other hand, when only the complex compound was used, even when it was left standing overnight, no progress of the polymerization was seen at all.

EXAMPLE 3

An Erlenmeyer flask of a capacity of 100 ml. was charged with 10 g. of ethanol and 30 ml. of complex compound were dissolved therein. 10 g. of acrylamide were dissolved therein and 40 mg. of tert-dodecyl mercaptan were added to the solution. The temperature was 23° C. In 2 minute, a reaction started violently and a white powdery polymer was produced. In 1 hour, the reaction ended. On the other hand, when only the complex compound was used, when it was left standing overnight, a slight white precipitate was produced and, at the same time, colorless columnar crystals which were though to be comprised of acrylamide were produced.

EXAMPLE 4

A reaction was conducted in exactly the same manner as in example 1 except that methyl methacrylate was used instead of the butyl acrylate. The progress of the reaction was slow. After the system was left standing overnight, it separated into two layers. The lower layer was a sticky solid. The upper layer was of a liquid containing a blackish brown precipitate. On the other hand, when only the complex compound was used, even when it was left standing overnight, the polymerization did not proceed at all.

EXAMPLE 5

When a reaction was conducted in exactly the same manner as in example 1 except that 80 mg. of octyl mercaptan were used instead of tert-dodecyl mercaptan, almost the same result was obtained.

EXAMPLE 6

When a reaction was conducted in exactly the same manner as in example 1 except that 10 g. of ethyl acetate were added and the amount of the complex compound was made 120 mg. in 1 hour, a viscous liquid high in viscosity was obtained.

EXAMPLE 7

A reaction was conducted in exactly the same manner as in example 1 except that 12 g. of butyl acrylate and 18 g. of vinyl acetate were used as monomers. In about 5 minutes after the addition of the mercaptan, a reaction started. The polymerization proceeded with heat generation and foaming. In one hour, there was obtained yellow liquid so high in the viscosity that it was difficult to flow. When only the complex compound was used, even when it was left standing overnight, the polymerization did not proceed at all.

EXAMPLE 8

A reaction was conducted in exactly the same manner as in example 1 except that 24 g. of acrylonitrile and 6 g. of vinylidene chloride were used as monomers and were fuse-sealed in a polymerizing glass ampoule together with the complex compound and the mercaptan. In about 10 minutes after the fuse-sealing, a reaction started. The polymerization gradually proceeded. After it was left standing overnight, a yellow precipitate was seen. On the other hand, when only the complex compound was used, even when it was left standing overnight, the polymerization did not proceed at all.

EXAMPLE 9

A reaction was conducted in exactly the same manner as in example 1 except that methacrylic acid was used instead of the butyl acrylate. In about 4 minutes after the addition of the mercaptan, a reaction started. A white precipitate was gradually produced. In an hour, the reaction was completed and an almost colorless powder was obtained. On the other hand, when only the complex compound was used, when it was left standing overnight, only a small amount of a light reddish brown precipitate was obtained. The same experiment at room temperature was also conducted with acrylic acid. In this case, not only in the presence of the mercaptan but also with only the complex compound, the reaction proceeded quickly and, in about 20 minutes, the entire body became a colorless transparent block.

The embodiments of the invention in which an exclusive property or privilege is claimed are defined as follows:

1. In a process for preparing polymer products wherein (1) a monomer or a mixture of monomers selected from the group consisting of acrylates, methacrylates, acrylonitrile methacrylonitrile, acrylamide, methacrylamide, methylol acrylamide and ethers thereof, methylol methacrylamide and ethers thereof, acrylic acid, methacrylic acid and vinylidene chloride, or (2) a mixture of less than 70 percent by weight of an ethylenically unsaturated monomer and more than 30 percent by weight of monomer of said group.

in admixture with about 0.01 to 2 mols of manganese (III) acetylacetone, as a polymerization initiator, per 100 mols of monomer or monomer mixture, is polymerized at a temperature below 150 percent the improvement which comprises providing in -ethylhexyl polymerization mixture a mercaptan of the formula RSH, wherein R is an alkyl radical having from one to 18 carbon atoms, the mercaptan being provided in an amount of about 0.1 to 10 mols per 1 of manganese (III) acetylacetone.

2. A process according to claim 1 wherein said acrylates are selected from the group consisting of the methyl, ethyl, butyl and 2-ethylhexyl esters of acrylic acid.

3. A process according to claim 1, wherein said methacrylates are selected from the group consisting of the methyl, ethyl, propyl, n-butyl, and isobutyl esters of methacrylic acid.

4. A process according to claim 1 wherein said mercaptan is selected from the group consisting of amyl mercaptan octyl mercaptan, decyl mercaptan, lauryl mercaptan, tert-dodecyl mercaptan and stearyl mercaptan.

5. A process according to claim 1 wherein said mercaptan is used in an amount of from 0.5 to 2 mols to 1 mol of said manganese (III) acetylacetone and said manganese (III) acetylacetone is used in an amount of from 0.1 to 1 to mol to 100 mols of said monomer or monomer mixtures.

6. A process according to claim 1 wherein the polymerization is carried out at room temperature.

* * * * *

UNITED STATES PATENT OFFICE
CERTIFICATE OF CORRECTION

Patent No. 3,627,820  Dated December 14, 1971

Inventor(s) Kiyoshi Chujo and Toru Ikuta

It is certified that error appears in the above-identified patent and that said Letters Patent are hereby corrected as shown below:

Column 4, line 75; change "150 percent" to ---150°C,---.
Column 5, line 1; change "-ethylhexyl" to ---the---.
Column 5, line 5; change "per 1 of" to ---per 1 mol of---

Signed and sealed this 27th day of June 1972.

(SEAL)
Attest:

EDWARD M. FLETCHER, JR.　　　　ROBERT GOTTSCHALK
Attesting Officer　　　　　　　　Commissioner of Patents